United States Patent [19]

Sasaki

[11] Patent Number: 4,626,266

[45] Date of Patent: Dec. 2, 1986

[54] CARBURETOR CHAMBER COVER DEVICE

[75] Inventor: Fujio Sasaki, Mitaka, Japan

[73] Assignee: Kioritz Corporation, Tokyo, Japan

[21] Appl. No.: 672,814

[22] Filed: Nov. 19, 1984

[30] Foreign Application Priority Data

Nov. 22, 1983 [JP] Japan .......................... 58-179572[U]

[51] Int. Cl.[4] .............................................. B01D 46/00

[52] U.S. Cl. ........................... 55/385 R; 55/DIG. 28; 55/DIG. 31; 55/511; 55/482; 55/509; 55/528; 30/383

[58] Field of Search ................ 55/DIG. 28, DIG. 31, 55/385 R, 418, 482, 509, 570, 501, 511; 30/381, 382, 383

[56] References Cited

U.S. PATENT DOCUMENTS 2,555,742 6/1951 Grue .................................... 55/507

3,203,158 8/1965 Zadra .................................... 55/505

3,452,521 7/1969 Remacle ............................... 55/419

3,881,250 5/1975 Frederickson ........................ 55/493

*Primary Examiner*—Bernard Nozick

*Attorney, Agent, or Firm*—Browdy and Neimark

[57] ABSTRACT

A carburetor chamber cover device for covering a carburetor chamber of a portable power-driven machine such as a chain saw. The carburetor chamber accommodates an air cleaner and a carburetor for supplying air-fuel mixture to an internal combustion engine. The cover device comprises a cover adapted to close the opening of the carburetor chamber and having an aperture, and a filter plate and a blind plate adapted to be selectively attached to the cover so as to fit the aperture. The filter plate has a screen capable of arresting comparatively large particles of dust. In order to avoid troubles such as blocking of the filter plate by snow or icing of the carburetor, the filter plate is detached and the blind plate is attached instead.

5 Claims, 3 Drawing Figures

CARBURETOR CHAMBER COVER DEVICE

BACKGROUND OF THE INVENTION

The present invention broadly relates to portable powered machines such as a chain saw and, more particularly, to a cover device for covering a carburetor chamber of such a type of machine.

Generally, a portable powered machine such as a chain saw has a carburetor chamber formed in the casing of the machine and accommodating an air cleaner and a carburetor for supplying an air-fuel mixture to the internal combustion engine as a power source. The carburetor chamber is closed by a carburetor chamber cover detachably secured to the casing and having slits. In operation of the machine, the ambient air is induced through the slits in the carburetor chamber cover and is supplied to the carburetor through the air cleaner.

This conventional arrangement, however, suffers from a disadvantage in that the air cleaner tends to be clogged soon with particles of dust and other foreign matter such as saw dust which can easily reach the air cleaner through the slits formed in the carburetor chamber cover. In the winter season, the air suction performance is often deteriorated by wetting of the air cleaner with snow which also can reach the air cleaner easily through the slits.

In consequence, the user is obliged to frequently clean the air cleaner after detaching the carburetor chamber cover. The frequent cleaning undesirably shortens the life of the air cleaner.

SUMMARY OF THE INVENTION

Accordingly, an object of the invention is to provide a carburetor chamber cover device for a portable powered machine, improved to unburden the user from the troublesome work such as frequent cleaning of the air cleaner, thus widening the applicability or use of the portable powered machine.

To this end, according to the invention, there is provided a carburetor chamber cover device for covering a carburetor chamber of a portable power-driven machine, the carburetor chamber accommodating an air cleaner and a carburetor for supplying air-fuel mixture to an internal combustion engine, the cover device comprising: a cover adapted to cover the opening of the carburetor chamber and having an aperture; and a filter plate and a blind plate adapted to be selectively attached to the cover so as to close the aperture.

The aperture may be elongated horizontally and formed in the side and rear walls of the cover.

DESCRIPTION OF THE PREFERRED EMBODIMENT

A preferred embodiment of the invention will be described hereinunder with reference to the accompanying drawings.

Figure 1:
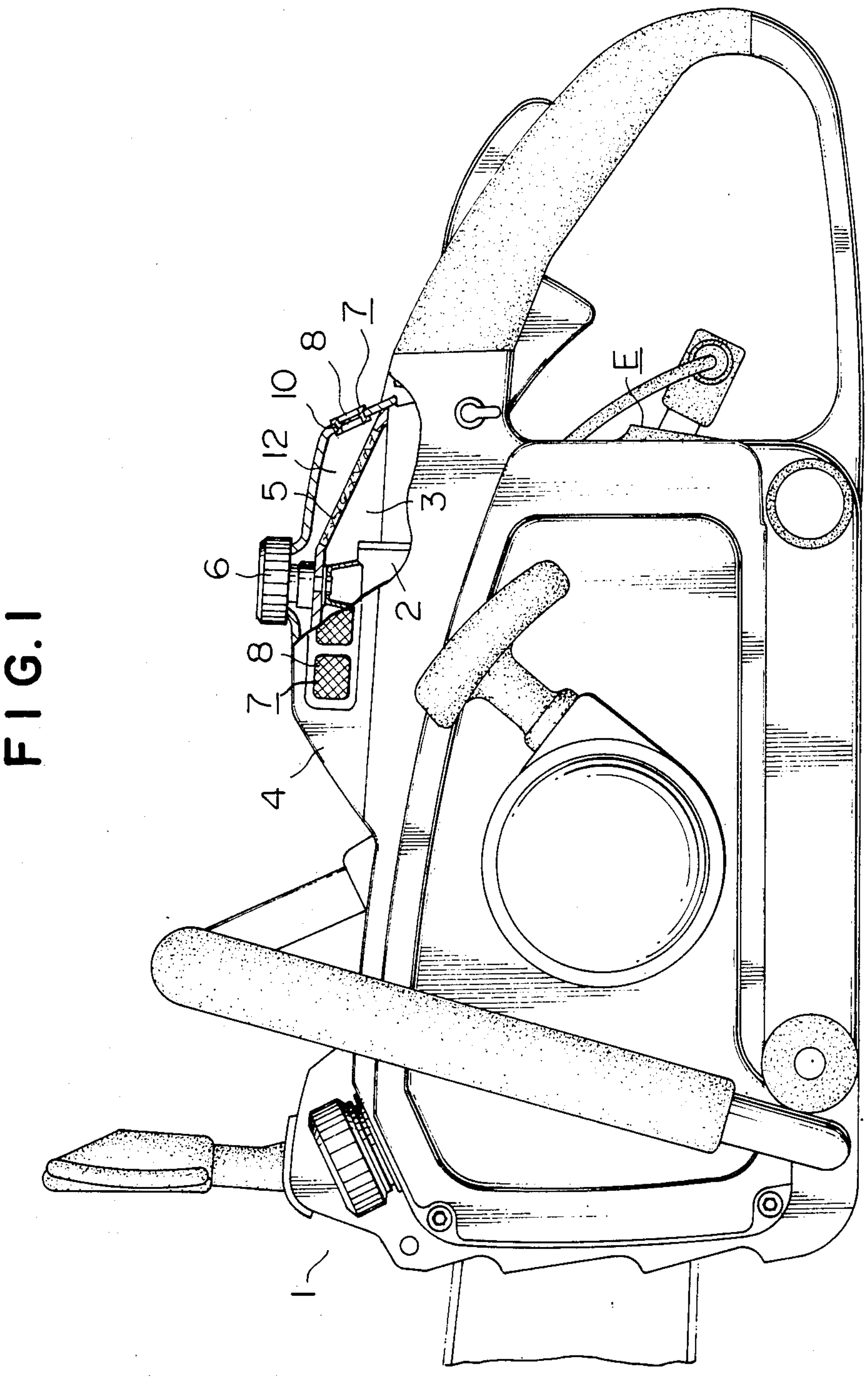
FIG. 1 is a fragmentary side elevational view of a chain saw equipped with a cover device in accordance with the invention.
Figure 2:
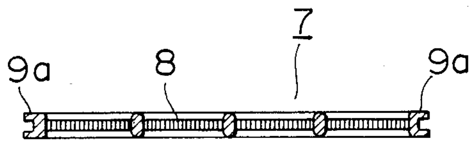
FIG. 2 is an enlarged cross-sectional view of a filter plate of the cover device as shown in FIG. 1.
Figure 3:
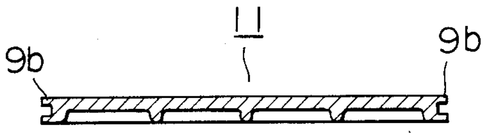
FIG. 3 is a cross-sectional view of a blind plate substitutive for the filter plate as shown in FIG. 2.

FIG. 1 shows a chain saw as an example of a portable powered machine to which the invention pertains. The chain saw generally designated at a numeral 1 has a casing in the upper portion of which is formed a carburetor chamber 3 opened at its upper side and receiving a carburetor 2 annexed to an internal combustion engine E. The open upper end of the carburetor chamber 3 is closed by a tubular main filter 5 and a cover 4 is detachably secured to the casing by means of a screw 6 such that a space 12 is formed between the main filter 5 and the cover 4. A horizontally elongated aperture 10 is formed in the side wall of the cover 4 defining the space 12. A filter plate 7 which is provided at its both ends with substantially U-shaped resilient retainers **9*a* is fitted to close the aperture 10 such that the retainers 9*a* engage corresponding edges of the side wall of the cover 4. The filter plate 7 has a nylon screen 8 of 60-mesh or so spread over substantial area thereof. This screen 8 arrests comparatively large dust particles and prevents the same from reaching the main filter 5 so that the interval of the protective maintenance of the main filter 5** can be prolonged advantageously.

In addition, since the nylon screen 8 is exposed directly to the ambient air, dust and foreign matter attaching to this screen can easily be wiped off during the use of the chain saw.

In order to avoid attaching of powder snow to the main filter 5 or icing of the carburetor 2, the filter plate 7 is detached and, instead, a blind plate 11 of the same shape as the filter plate 7 is fitted to the cover 4 to close the aperture 10. In such a case, the air warmed by the internal combustion engine E is induced to the carburetor 2 so as to avoid any accident which may, otherwise, be caused by the blocking of the filter plate 7 with the snow or icing of the carburetor 3.

In addition, the suction noise can be suppressed considerably.

What is claimed is:

1. A carburetor chamber cover kit including a device for covering a carburetor chamber of a portable power-driven machine, said carburetor chamber accommodating an air cleaner and a carburetor for supplying air-fuel mixture to an internal combustion engine, said cover kit comprising:

a cover adapted to cover the opening of said carburetor chamber and having a plurality of air-inlet apertures; and a plurality of filter plates and a plurality of blind plates adapted to be alternatively selectively attached to said cover so as to fit said plurality of apertures.

2. A carburetor chamber cover kit according to claim 1, wherein said filter plates and said blind plates are provided with substantially U-shaped resilient retainers fitted to close the aperture such that said resilient retainers engage corresponding edges of the side wall of said cover defining said apertures.

3. A carburetor chamber cover kit according to claim 1, wherein said filter plates are formed of screen material.

4. A carburetor chamber cover kit according to claim 3, wherein said screens are formed of nylon.

5. A carburetor chamber cover kit according to claim 4, wherein said nylon screens are of screen opening size of about 60-mesh.

* * * * *